United States Patent
Okuzono (10) Patent No.: US 9,934,456 B2
(45) Date of Patent: Apr. 3, 2018

(54) PRINTING DEVICE HAVING RESTRICTION PRINT FUNCTION

(71) Applicant: BROTHER KOGYO KABUSHIKI KAISHA, Nagoya, Aichi (JP)

(72) Inventor: Taisei Okuzono, Nagoya (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 5 days.

(21) Appl. No.: 14/661,537

(22) Filed: Mar. 18, 2015

(65) Prior Publication Data
US 2015/0278651 A1    Oct. 1, 2015

(30) Foreign Application Priority Data

Mar. 31, 2014  (JP) .................. 2014-071114

(51) Int. Cl.
*G06F 3/12*     (2006.01)
*G06K 15/00*    (2006.01)
(Continued)

(52) U.S. Cl.
CPC ..... *G06K 15/4065* (2013.01); *G06K 15/1817* (2013.01); *G06K 15/4095* (2013.01)

(58) Field of Classification Search
CPC ............ B65H 2220/01; B65H 2220/02; B65H 2220/03; B65H 2220/09; B65H 2220/11;
(Continued)

(56) References Cited

U.S. PATENT DOCUMENTS 5,534,974 A * 7/1996 Hasegawa ................ B65H 3/44
                                                      399/1
7,151,613 B1 * 12/2006 Ito .......................... G06F 3/1222
                                                      358/1.14
(Continued)

FOREIGN PATENT DOCUMENTS

JP    2001147791 A    5/2001
JP    2001-353933 A   12/2001
(Continued)

OTHER PUBLICATIONS

Official Action dated Nov. 28, 2017 received from the Japanese Patent Office in related JP 2014-071114 together with English language translation.

*Primary Examiner* — Chad Dickerson
(74) *Attorney, Agent, or Firm* — Scully, Scott, Murphy & Presser, PC (57) ABSTRACT

A printing device includes: a supply tray; a sensor; a print unit; a memory; and a controller. The sensor is configured to selectively output a first signal indicating absence of a sheet on the supply tray and a second signal indicating presence of a sheet on the supply tray. The controller is configured to: create first authentication information when the first signal changes to the second signal; store the first authentication information in the memory; accept a job that uses a sheet on the supply tray; determine that a first job is accepted, the first job being such a job that accompanies second authentication information, the first job being executable when the second authentication information is in coincidence with the first authentication information; and control the print unit to execute the first job.

16 Claims, 8 Drawing Sheets (51) Int. Cl.
*G06K 15/02* (2006.01)
*G03G 15/00* (2006.01)

(58) Field of Classification Search
CPC ........ B65H 2220/416; B65H 2220/414; B65H 2220/412; B65H 2511/50; B65H 2511/51; B65H 2511/515; B65H 2511/52; B65H 2551/00; B65H 2551/10; B65H 2551/20; B65H 2557/64; B65H 43/00; B65H 43/02; G06F 21/608; G06F 3/1222; G06F 3/1236; G06F 3/1207; G06F 3/121; G06F 3/1234; G06F 3/1237; G06F 3/1238; G06F 3/1263; G06F 3/1294; H04N 1/00694; H04N 1/00623; H04N 1/4413; H04N 1/4433; H04N 1/444; H04N 1/00567; H04N 1/2353; H04N 1/00689; H04N 1/00692; H04N 1/2367; H04N 1/2392; H04N 1/2369; H04N 1/00851; H04N 1/2323; H04N 1/00092; H04N 1/00681; H04N 1/00687; H04N 1/0062; H04N 1/00644; G06K 15/4065; G06K 15/4095; G06K 15/1803; G06K 15/1817

USPC ......... 358/1.11–1.18, 1.1, 1.9, 2.1, 400–404; 399/8–13, 16–18, 361, 371; 726/26–33, 726/1–5, 16–19, 21

See application file for complete search history.

(56) References Cited

U.S. PATENT DOCUMENTS

| | | | |
|---|---|---|---|
| 7,755,794 B2* | 7/2010 | Martin | G06F 21/608 |
| | | | 358/1.6 |
| 8,379,237 B2* | 2/2013 | Tominaga | G06F 3/121 |
| | | | 347/19 |
| 9,174,813 B2* | 11/2015 | Sakata | B65H 3/44 |
| 2002/0051182 A1* | 5/2002 | Sommer | H04N 1/00408 |
| | | | 358/1.15 |
| 2005/0088679 A1 | 4/2005 | Martin et al. | |
| 2005/0100378 A1* | 5/2005 | Kimura | G06F 3/1222 |
| | | | 400/76 |
| 2005/0179933 A1 | 8/2005 | Akao | |

FOREIGN PATENT DOCUMENTS

JP  2005-236357 A  9/2005
JP  2007015295 A  1/2007

* cited by examiner

PRINTING DEVICE HAVING RESTRICTION PRINT FUNCTION

CROSS REFERENCE TO RELATED APPLICATION

This application claims priority from Japanese Patent Application No. 2014-071114 filed Mar. 31, 2014. The entire content of the priority application is incorporated herein by reference.

TECHNICAL FIELD

The present disclosure relates to a printing device, and particularly to a technique of controlling whether to execute printing.

BACKGROUND

A technique of controlling whether to execute printing in a printing device is well known in the art. For example, a user sets a temporary password for a specific sheet supply port of a printing device. The printing device restricts printing through the specific sheet supply port with respect to a print job which does not accompany the password while the password is set (see Japanese Patent Application Publication No. 2001-353933).

SUMMARY

In the above conventional technique, however, since authentication information is set by a user at any given point in time, it sometimes happens that one user (first user) first mounts sheets on the supply tray, and thereafter returns to a host computer so as to set the authentication information through the host computer. In this case, there is a possibility that another user (second user) inputs a job before the first user sets the authentication information. In such a situation, the sheets are used for the job of the second user.

In view of the foregoing, it is an object of the disclosure to solve the problems of the conventional technique described above. That is, it is an object of the disclosure to provide a printing device that controls whether to execute printing and can reduce possibility that sheets mounted by one user are unintentionally used by other users.

In order to attain the above and other objects, the disclosure provides a printing device that includes: a supply tray; a sensor; a print unit; a memory; and a controller. The sensor is configured to selectively output a first signal indicating absence of a sheet on the supply tray and a second signal indicating presence of a sheet on the supply tray. The controller is configured to: create first authentication information when the first signal changes to the second signal; store the first authentication information in the memory; accept a job that uses a sheet on the supply tray; determine that a first job is accepted, the first job being such a job that accompanies second authentication information, the first job being executable when the second authentication information is in coincidence with the first authentication information; and control the print unit to execute the first job.

BRIEF DESCRIPTION OF THE DRAWINGS

The particular features and advantages of this disclosure as well as other objects will become apparent from the following description taken in connection with the accompanying drawings, in which.

DETAILED DESCRIPTION

Embodiments embodying a printing device will be described in detail while referring to the accompanying drawings wherein like parts and components are designated by the same reference numerals to avoid duplicating description. The embodiments described below relate to a multifunction peripheral (MFP) having a print function and a reading function.

[Entire Configuration of MFP]

Figure 1:
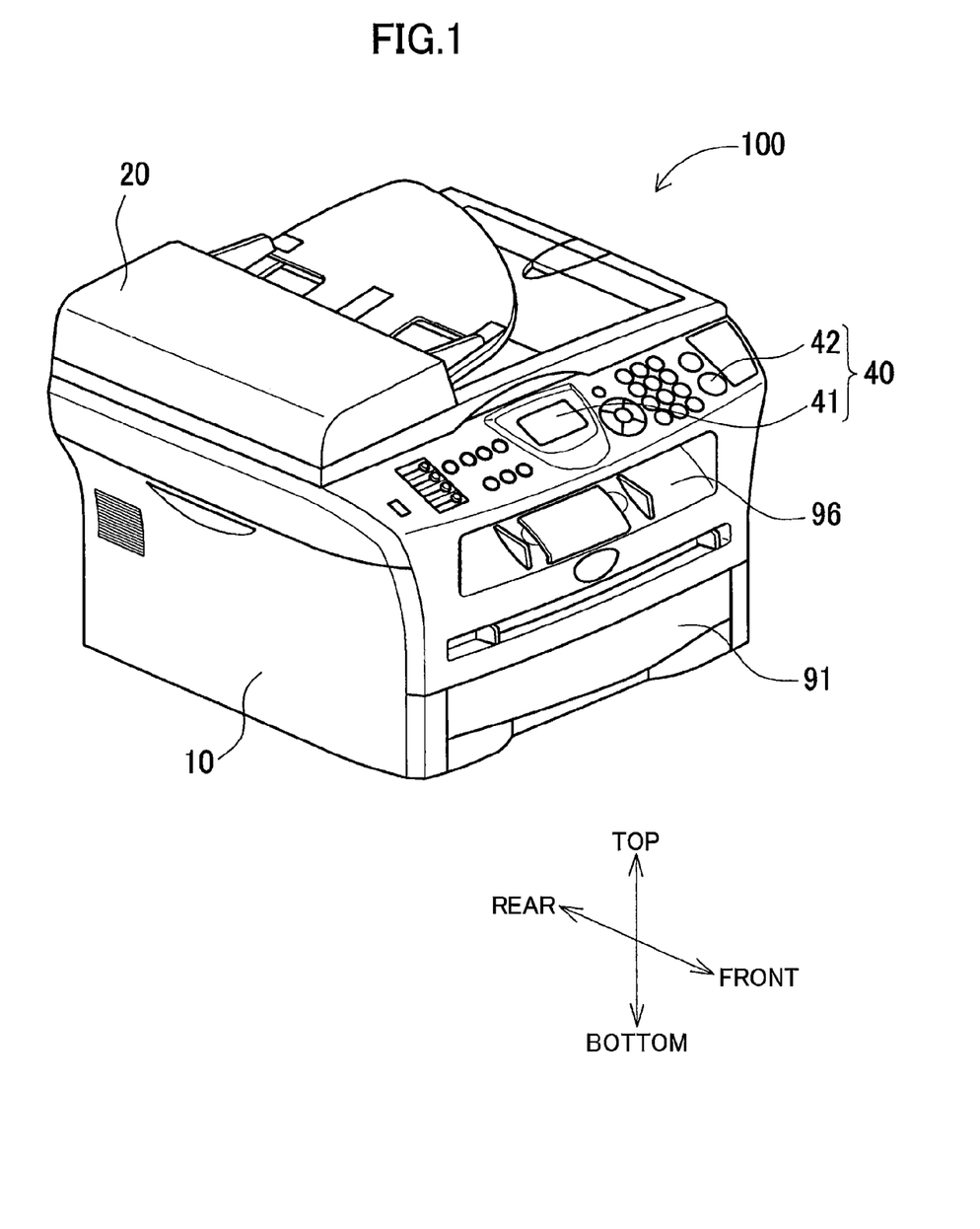
FIG. 1 is a perspective view showing a schematic configuration of a multifunction peripheral (MFP) according to embodiments.

As illustrated in FIG. 1, an MFP 100 according to the embodiments includes an image forming unit 10, an image reading unit 20, and an operation panel 40. The image forming unit 10 forms an image onto a sheet. The image reading unit 20 reads an image of an original. The operation panel 40 displays an operating condition of the MFP 100 and accepts instructions inputted by a user. The operation panel includes a display unit 41 having a liquid crystal display, and a button group 42 including a start key, a stop key, ten-key numerical keypad, and the like. The MFP 100 is an example of the printing device. The operation panel 40 is an example of an operation unit.

The image forming unit 10 may employ an electrophotographic system or an inkjet system as an image forming system. The image forming unit 10 may be capable of forming a color image or configured to form only a monochrome image. Similarly, the image reading unit 20 may be capable of reading a color image or configured to read only a monochrome image. The image forming unit 10 is an example of a print unit.

Further, the MFP 100 has a supply tray 91 and a discharge tray 96. The supply tray 91 is located at a bottom of the MFP 100, detachably attached to a main body, and accommodates sheets to be printed. The discharge tray 96 is located at an upper surface of the main body, and printed sheets are discharged onto the discharge tray 96. When executing printing, the MFP 100 conveys the sheet on the supply tray 91 therein and discharges the printed sheet thereout onto the discharge tray 96.

[Electrical Configuration of MFP]

Figure 2:
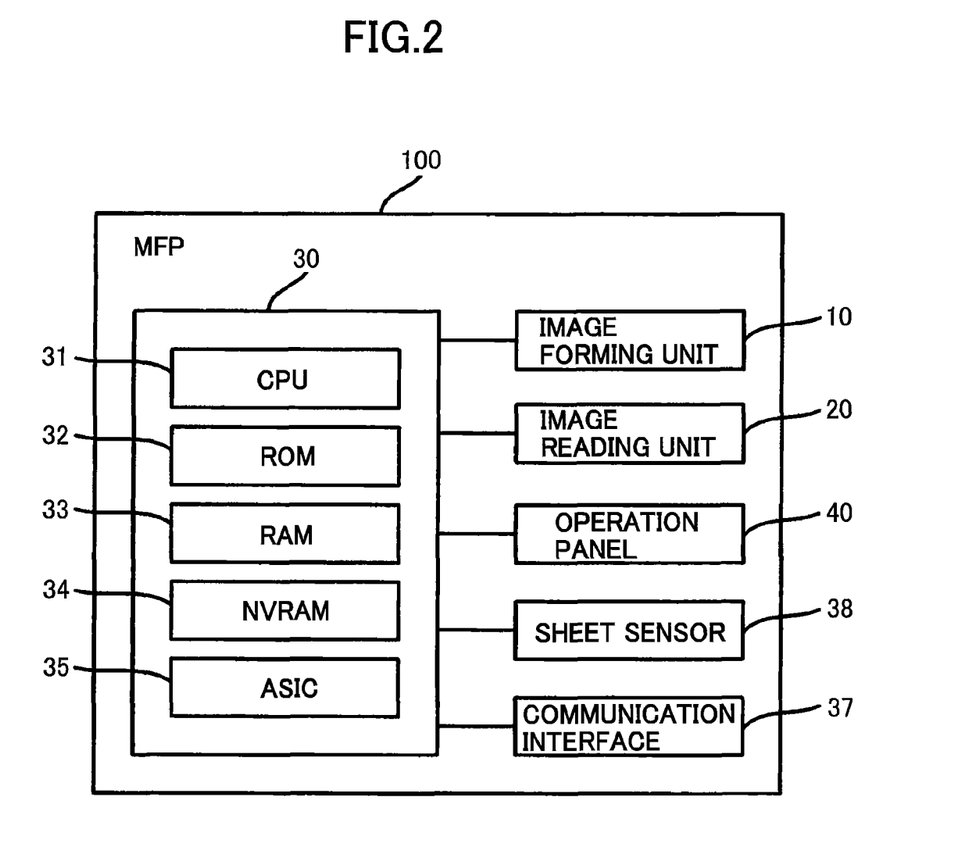
FIG. 2 is a block diagram showing an electrical configuration of the MFP shown in FIG. 1.

Next, an electrical configuration of the MFP will be described. As illustrated in FIG. 2, the MFP 100 has a controller 30 including a CPU 31, a ROM 32, a RAM 33, a NVRAM (non-volatile RAM) 34, and an ASIC 35. Further, the MFP 100 includes the image forming unit 10, the image reading unit 20, the operation panel 40, a sheet sensor 38 whose output signal value changes depending on presence or absence of the sheet on the supply tray 91, and a communication interface 37 for connection to an external device. These components are controlled by the CPU 31.

The controller 30 shown in FIG. 2 denotes hardware components, such as the CPU 31 and the like, that are used for controlling the MFP 100, and does not always indicate a single hardware component actually implemented in the MFP 100.

The ROM 32 stores firmware which is a control program for controlling the MFP 100, various setting, default values, and the like. The RAM 33 and the NVRAM 34 are each used as a work area to which various control programs are loaded or a storage area for temporarily storing image data. The RAM 33 and the NVRAM 34 are examples of a memory.

The CPU 31 controls each component in the MFP 100 according to the control program read from the ROM 32 and signals transmitted from various sensors while storing a processing result thereof into the RAM 33 or NVRAM 34. The CPU 31 is an example of a controller. The controller 30 may serve as the controller, or the ASIC 35 may serve as the controller.

The communication interface 37 is a hardware component that enables communication with another device. Specific examples of the communication interface 37 include a wired LAN interface, a wireless LAN interface, a serial communication interface, and a facsimile interface. The MFP 100 can receive a job causing the image forming unit 10 to form an image from an external device through the communication interface 37.

The sheet sensor 38 is a sensor that is used for determining presence or absence of the sheet on the supply tray 91. The sheet sensor 38 is, for example, an optical sensor having a light-emitting element and a light-receiving element. When the sheet is present on the supply tray 91, light from the light-emitting element is shielded; when the sheet is absent on the supply tray 91, the light from the light-emitting element is received by the light-receiving element. In this manner, an output signal value from the light-receiving element changes depending on the presence or absence of the sheet. The sheet sensor 38 is not limited to the optical sensor, but any type of sensors may be used as long as they can be used for determination of the presence or absence of the sheet. For example, a weight sensor whose output signal value changes depending on the presence or absence of the sheet may be used. The sheet sensor 38 is an example of a sensor.

[Restriction Print Function]

Next, control performed in the MFP 100 will be described. The MFP 100 has a restriction print function to restrict printing using the sheet on the supply tray 91. Whether to enable or disable the restriction print function is set through an operation on the operation panel 40.

When the restriction print function is enabled, the MFP 100 waits for a sheet to be mounted on the supply tray 91. When a sheet is mounted on the supply tray 91, the MFP 100 creates a password and notifies the user of the password. The password is temporarily stored in the NVRAM 34.

The user checks the password created by the MFP 100 and inputs a print job to which the password is added into the MFP 100. For example, when the print job is input into the MFP 100 from an external device such as a personal computer (PC), a mobile device, and the like, the user inputs the password to the external device. The external device writes the password in a header area of print data upon receipt of the password, and thereafter transmits the print data. That is, the external device adds the password to the print job.

The MFP 100 controls whether to execute the print job using the sheet on the supply tray upon receipt of the print job when the password is stored therein. That is, the MFP 100 permits printing corresponding to the print job to which a password that coincides with the password stored in the NVRAM 34 is added, and restricts printing corresponding to the print job to which no password is added or a password that does not coincide with the password stored in the NVRAM 34 is added.

That is, if the restriction print function is enabled, the printing is not executed unless the password issued when the sheet is mounted is added to the print job. On one hand, one user (first user) who has mounted the sheet knows the password and therefore can input the print job to which the password is added. On the other hand, another user (second user) does not know the password, and therefore cannot input the print job to which the password is added. Thus, a possibility that the print job of the first user is interrupted by a job of the second user within the time that the first user mounts the sheet and the time that the first user inputs the print job is reduced in the MFP 100.

[Control Performed in MFP]

[First Embodiment]

Next, a procedure of a restriction print process that realizes the above described restriction print function will be described with reference to a flowchart shown in FIG. 3. The restriction print process is executed by the CPU 31 after the restriction print function is enabled.

In the restriction print process, the MFP 100 first determines whether or not the sheet is present on the supply tray 91 (S111). The MFP 100 determines the presence or absence of the sheet depending on whether the output signal of the sheet sensor 38 has a value indicating presence of the sheet or absence of the sheet. When the sheet is not present on the supply tray 91 (S111: NO), the MFP 100 determines whether the sheet has been mounted on the supply tray 91 (S112). The MFP 100 determines that the sheet has been mounted on the supply tray 91 by recognizing a change of the output signal value of the sheet sensor 38 from a value indicating absence of the sheet to a value indicating presence of the sheet. While the sheet has not been mounted on the supply tray 91 (S112: NO), the MFP 100 waits for the sheet to be mounted on the supply tray 91.

When the sheet is present on the supply tray 91 (S111: YES), or when the sheet has been mounted on the supply tray 91 (S112: YES), the MFP 100 executes a password creation process to create a password (S101). FIG. 4 illustrates a procedure of the password creation process.

In the password creation process, the MFP 100 first acquires a sheet type of the sheet (S121). The sheet type may be previously stored in the NVRAM 34 as an attribute set to the supply tray 91 or as one of setting items concerning the restriction print function. The MFP 100 reads the stored information. In a case that the MFP 100 is provided with a sensor capable of acquiring a size or a thickness of the sheet mounted on the supply tray 91, the MFP 100 may acquire the sheet type based on an output signal of the sensor. In the step S121, the MFP 100 need not acquire a concrete type of the sheet but only needs to acquire information indicating whether or not the sheet belongs to a specific sheet type.

After the step S121, the MFP 100 determines whether or not the sheet type belongs to a specific sheet type (S122). The restriction of the printing using the sheet on the supply tray 91 is desirably applied to when a highly valued sheet such as a glossy paper, a postcard, an OHP sheet, or the like is used; on the other hand, necessity of the restriction of the printing is low when the sheet is not highly valued, that is, when a regular paper or the like is used. Thus, when the sheet type does not belong to the specific sheet type (S122: NO), the MFP 100 ends the password creation process without creating a password. The specific sheet type may be set by the user each time or may be previously set.

When the sheet type belongs to the specific sheet type (S122: YES), the MFP 100 creates a password (S123). For example, in the step S123, the MFP 100 generates a random number and creates a password composed of randomly sampled digits. The password is an example of first authentication information. After the step S123, the MFP 100 stores the created password in the NVRAM 34 (S124).

After the step S124, the MFP 100 notifies the user of the created password (S125). The MFP 100 may notify the user of the password through display thereof on the display unit 41 of the operation panel 40, through an audio message, or through an e-mail. After the step S125, the MFP 100 ends the password creation process.

Figure 3:
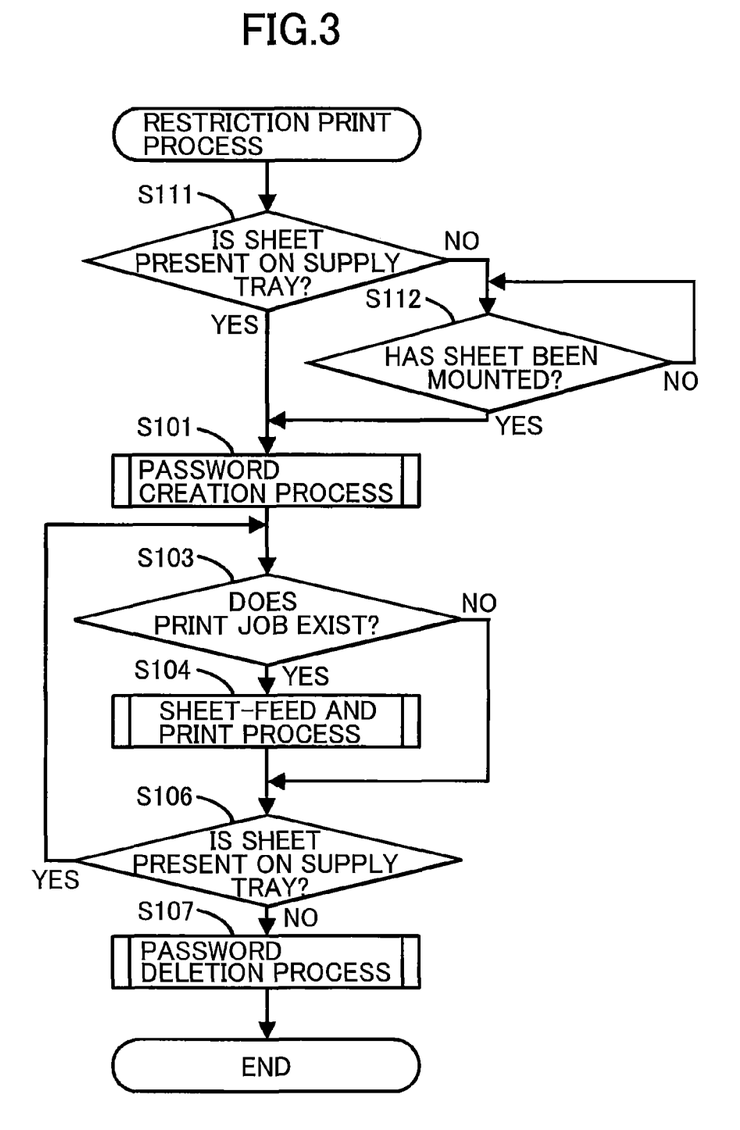
FIG. 3 is a flowchart illustrating steps in a restriction print process according to a first embodiment.
Figure 4:
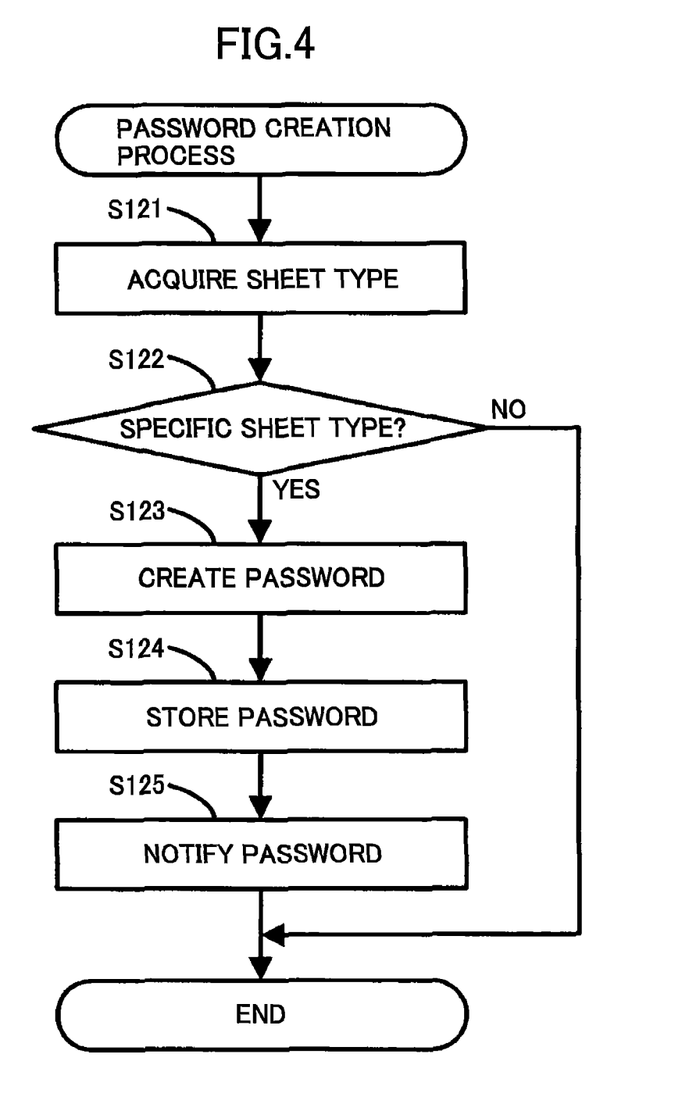
FIG. 4 is a flowchart illustrating steps in a sheet-feed and print process according to the first embodiment.

Referring back to the flowchart of FIG. 3, after the step S101, the MFP 100 determines whether or not a print job using the sheet on the supply tray 91 exists (S103). The print job may be received from an external device through the communication interface 37 or received from the user through the operation panel 40. When the print job does not exist (S103: NO), the MFP 100 determines whether or not the sheet is present on the supply tray 91 (S106). The MFP 100 determines that the sheet is present on the supply tray 91 while the sheet sensor 38 outputs the signal value indicating presence of the sheet. When the sheet is present on the supply tray 91 (S106: YES), the MFP returns to the step S103.

Figure 5:
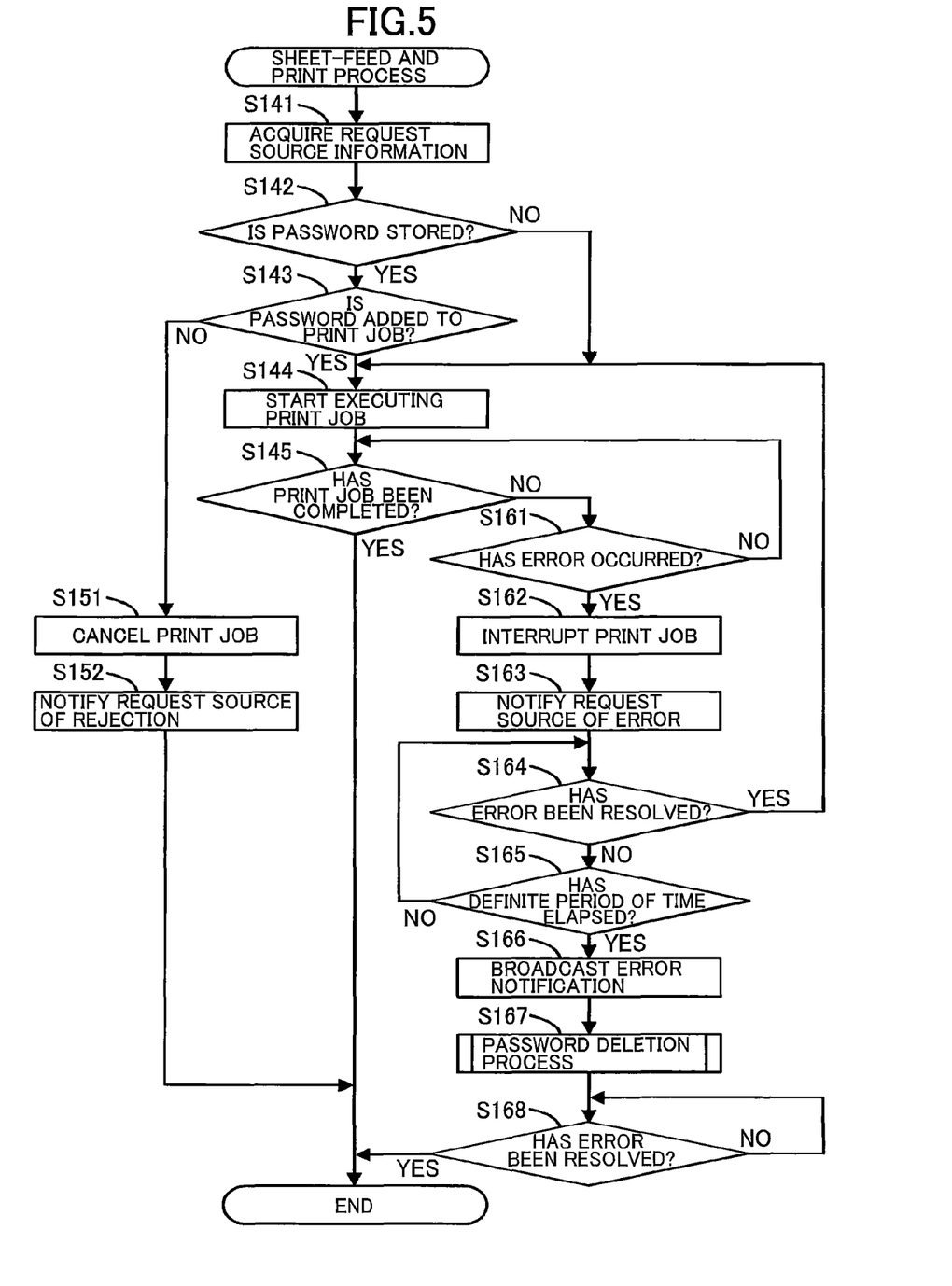
FIG. 5 is a flowchart illustrating steps in a password creation process according to the first embodiment.

When the print job using the sheet on the supply tray 91 exists (S103: YES), the MFP 100 executes a sheet-feed and print process to control printing using the sheet on the supply tray 91 (S104). FIG. 5 illustrates a procedure of the sheet-feed and print process of the step S104.

In the sheet-feed and print process, the MFP 100 acquires information concerning a request source of the print job (S141). The information concerning the request source of the print job corresponds to, for example, an IP address or a node name. In the case that the information concerning the request source of the print job is added to header information of the print data, the MFP 100 reads the request source information from the header information. Further, the MFP 100 may determine the request source from a communication packet of the print job. In the case that the print job is received through the operation panel 40, the MFP 100 sets the request source as the MFP 100 itself.

After the step S141, the MFP 100 determines whether or not a password is stored in the NVRAM 34 (S142). That is, even if the restriction print function is enabled, the password is not created when the sheet mounted on the supply tray 91 does not belong to the specific sheet type. Therefore, the MFP 100 determines here whether or not a password is stored in the NVRAM 34. When the password is not stored (S142: NO), the MFP executes the print job (S144). That is, the MFP 100 starts feeding the sheet from the supply tray 91 and controls the image forming unit 10 to execute printing corresponding to the print job.

On the other hand, when the password is stored (S142: YES), the MFP 100 determines whether or not a password coinciding with the password stored in the NVRAM 34 is added to the print job (S143). Specifically, a negative determination is obtained when the password itself is not added to the print job. Further, a negative determination is also obtained when the password, even if added to the print job, does not coincide with the password stored in the NVRAM 34. That is, an affirmative determination is obtained only when a password is added to the print job and this password coincides with the password stored in the NVRAM 34.

When the negative determination is obtained in the step S143 (S143: NO), the MFP 100 cancels the print job (S151) and outputs a rejection notification indicating rejection of the printing to the request source of the print job (S152). That is, the print job to which a password coinciding with the password stored in the NVRAM 34 is not added is highly likely to be a print job of a user different from the user who has mounted the sheet on the supply tray 91. Therefore, the MFP 100 restricts execution of such a print job. The processes of the steps S151 and S152 may be executed in the reverse order to that described above or may be executed simultaneously.

When the affirmative determination is obtained in the step S143 (S143: YES), the MFP 100 starts executing the print job (S144). That is, the print job to which a password coinciding with the password stored in the NVRAM 34 is added is highly likely to be a print job of the user who has mounted the sheet on the supply tray 91. Therefore, the MFP 100 permits execution of such a print job and feeds the sheet from the supply tray 91 to make the image forming unit 10 start printing.

Thereafter, the MFP 100 determines whether or not the print job by which the printing was started has been completed (S145). When the print job has not been completed (S145: NO), the MFP 100 determines whether or not an error that interrupts the printing has occurred (S161). Examples of the error that interrupts the printing include absence of the sheet on the supply tray 91, a lack of coloring agent, and a sheet jam. When the error has not occurred (S161: NO), the MFP 100 shifts to the step S145 and continues the printing until the print job is completed or until the error occurs.

On the other hand, when the error has occurred (S161: YES), the MFP 100 interrupts the printing (S162). Then, the MFP 100 notifies the request source of the print job that is being interrupted of information indicating that the printing is interrupted due to occurrence of the error (S163). The request source of the print job is identified on the basis of the information acquired in the step S141. With this process, earlier resuming of the printing by the user who inputs the print job can be expected. Further, right after the interruption of the printing, the MFP 100 makes the above notification only to the request source of the print job that is being interrupted. Accordingly, other users are less likely to be bothered. The processes of the steps S162 and S163 may be executed in the reverse order to that described above or may be executed simultaneously.

After the step S163, the MFP 100 determines whether or not the error has been resolved (S164). When a reason for the error is the absence of the sheet on the supply tray 91, for example, the resolving of the error can be determined by a change of the output signal value of the sheet sensor 38 from the value indicating absence of the sheet to the value indicating presence of the sheet due to remounting the sheet on the supply tray 91 after interruption of the printing corresponding to the print job. When the error has not been resolved (S164: NO), the MFP 100 determines whether or not a definite period of time has elapsed from the interruption of the printing in the step S162 (S165). The definite period time is, for example, 10 minutes. When the definite period of time has not elapsed (S165: NO), the MFP 100 waits for resolving of the error or elapse of the definite period of time.

When the error has been resolved (S164: YES), the MFP shifts to the step S144 and resumes the printing. When the print job has been interrupted due to the absence of the sheet, for example, the MFP 100 resumes the printing upon mounting of the sheet. When the print job has been interrupted due to the sheet jam, the MFP 100 resumes the printing upon removal of the sheet causing the sheet jam.

When the printing is resumed from an error sate due to the absence of the sheet or the sheet jam caused by the last sheet, a new sheet is mounted for resolving the error. Therefore, the output signal of the sheet sensor 38 changes from the signal indicating absence of the sheet to the signal indicating presence of the sheet. However, the print job is less likely to be interrupted by a print job of another user during the interruption of the printing. Thus, the MFP 100 does not perform recreation of a password and does not make the user input the password once again. This reduces time and labor of the user. The absence of the sheet or sheet jam caused by the last sheet is an example of an error.

On the other hand, when the error has not been resolved even after elapse of the definite period of time from the interruption of the printing (S165: YES), the MFP 100 notifies devices other than the request source of the print job being interrupted of information indicating that the printing is interrupted due to occurrence of the error (S166). For example, the MFP 100 broadcasts an instruction of the notification to a network connected with the MFP 100. When the error has not been resolved even after elapse of the definite period of time, the user who has input the print job is highly likely not to be aware of the error. Consequently, print restriction on print jobs of other users is prolonged, increasing discontent of the other users. Thus, the interruption due to the error is widely notified so as to increase possibility of resolving the error.

Figure 6:
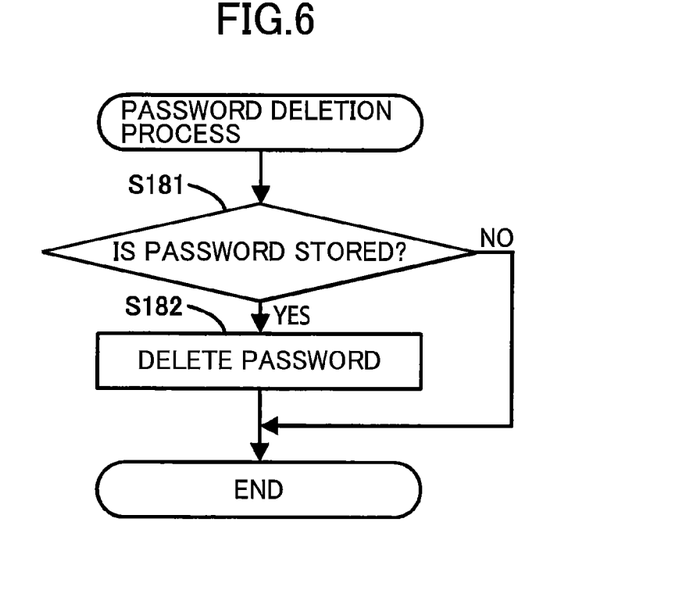
FIG. 6 is a flowchart illustrating steps in a password deletion process according to the first embodiment.

There is a possibility that the user who resolves the error differs from the user who has mounted the sheet. In this case, the user who has mounted the sheet is less likely to input the print job in the very near feature. Consequently, it is preferable not to make restriction on the printing using the password in this situation. Thus, after the step S166, the MFP 100 executes a password deletion process to delete the password from the NVRAM 34 (S167). FIG. 6 illustrates a procedure of the password deletion process. The processes of the steps S166 and S167 may be executed in the reverse order to that described above or may be executed simultaneously.

In the password deletion process, the MFP 100 determines whether or not the password is stored in the NVRAM 34 (S181). When the password is stored (S181: YES), the MFP 100 deletes the password from the NVRAM 34 (S182). After the step S182 or when the password is not stored (S181: NO), the MFP 100 ends the password deletion process.

Referring back to the flowchart of FIG. 5, after deleting the password in the step S167, the MFP 100 determines whether or not the error has been resolved (S168). When the error has not been resolved (S168: NO), the MFP 100 waits for resolving of the error.

When the error has been resolved (S168: YES), after output of the rejection notification in the step S152, or when the print job has been completed (S145: YES), the MFP 100 ends the sheet-feed and print process.

Referring back to the flowchart of FIG. 3, after the step S104, the MFP 100 shifts to the step S106. When the sheet is not present on the supply tray 91 (S106: NO), the MFP 100 executes the password deletion process to delete the password from the NVRAM 34 (S107). The process of the step S107 is the same as the process of the step S167 described above. The MFP 100 determines that the sheet is not present on the supply tray 91 while the sheet sensor 38 outputs the signal value indicating absence of the sheet. After the step S107, the MFP 100 ends the restriction print process.

As described above, there is a possibility that the sheet is mounted on the supply tray 91 during interruption of the printing in the restriction print process. Thus, when the sheet is mounted on the supply tray 91 during execution of the restriction print process, the MFP 100 does not execute a new restriction print process, and continues the restriction print process that is being executed.

In the restriction print process according to the first embodiment, when the output signal value of the sheet sensor 38 changes from the value indicating absence of the sheet to the value indicating presence of the sheet, the MFP 100 creates and stores the password. The MFP 100 further notifies the user of the created password. In a state where the password is stored, the MFP 100 starts printing upon receipt of a print job (first job) that accompanies the password and does not execute printing upon receipt of a print job (second job) that does not accompany the password. Thus, the MFP 100 can control execution of printing using the sheet on the supply tray 91 immediately after the sheet is mounted on the supply tray 91. As a result, a possibility that sheet is unintentionally used by other users within the time that the sheet is mounted and the time that the user who mounted the sheet inputs the print job is reduced.

Further, when the first job is interrupted due to an error such as absence of the sheet and, thereafter, the error is resolved, the MFP 100 resumes the first job without creating the password. The first job is less likely to be interrupted by a print job of another user during the interruption of the printing. Thus, the MFP 100 resumes the printing without recreating the password. This reduces time and labor of the user.

Further, when a deletion condition which is a condition for deleting the password is met, the MFP 100 deletes the password from the NVRAM 34. The user of the supply tray 91 can be prevented from being restricted for a long time by setting the deletion condition.

Further, the deletion condition described above is met when either the first job is completed and the sheet is not present on the supply tray 91 or the first job has not been received and the sheet is not present on the supply tray 91. Necessity of restricting the use of the supply tray 91 is low when any process for the first job is not performed and the sheet is not present on the supply tray 91. Thus, the MFP 100 deletes the password and prompts other users to use the supply tray 91.

Further, the deletion condition described above is met when the interruption of the printing corresponding to the first job is not resolved within a definite period of time after the occurrence of the interruption. When the interruption of the printing continues for a long time to thereby restrict other users from using the supply tray 91, discontent of the other users is increased. Thus, the currently set password is deleted to cancel the restriction on the printing to thereby suppress an increase in the discontent.

Further, when the first job is completed in a state where the sheet is present on the supply tray 91, the MFP 100 retains the password in the NVRAM 34 until the output signal value of the sheet sensor 38 changes from the value indicating presence of the sheet to the value indicating absence of the sheet. When the sheet is left on the supply tray 91 after completion of the first job, another job that runs as the first job may be input afterward. Thus, the MFP 100 retains the password until the sheet on the supply tray 91 is absent so as to restrict the use of the sheet by other users.

Further, the MFP 100 acquires the sheet type of the sheet on the supply tray 91 and determines whether or not to create the password depending on the acquired sheet type. The sheet differs in value depending on the type thereof. Thus, control according to the value of the sheet can be achieved by determining whether or not to create the password depending on the sheet type.

Further, when the first job is interrupted, the MFP 100 notifies the request source of the first job of the corresponding information. By making the above notification only to the request source of the first job, early resolving of the interruption can be expected to be achieved without bothering other users.

Further, the MFP 100 notifies devices other than the request source of the first print job when the printing corresponding to the first job has not been resumed even after elapse of the definite period of time from the notification to the request source of the first job. Therefore, occurrence of the interruption is broadly notified, and thus, earlier resolving of the interruption can be expected.

[Second Embodiment]

Figure 7:
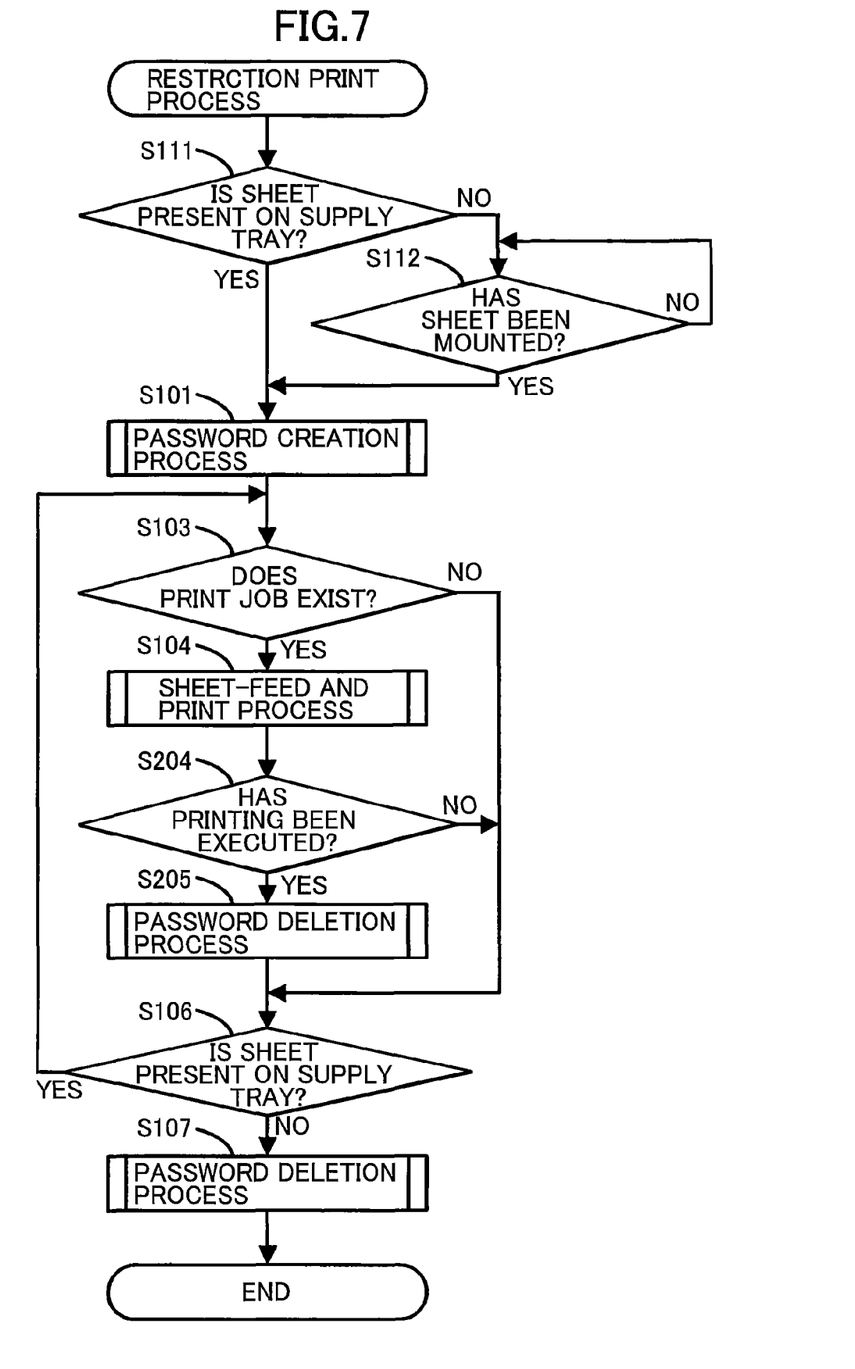
FIG. 7 is a flowchart illustrating steps in a restriction print process according to a second embodiment.

Next, another embodiment of the restriction print process will be described with reference to a flowchart shown in FIG. 7. In the restriction print process according to a second embodiment, the password is deleted under a condition where the print job is completed, separately from a condition where the sheet on the supply tray 91 is absent. The second embodiment differs from the first embodiment in which the password is deleted both when the print job is completed and when the sheet on the supply tray 91 is absent. In the following description, the same processes as those of the first embodiment are designated by the same reference numerals to avoid duplicating description.

In the restriction print process according to the second embodiment, the MFP 100 first determines whether or not the sheet is present on the supply tray 91 (S111). When the sheet is not present on the supply tray 91 (S111: NO), the MFP 100 determines whether the sheet has been mounted on the supply tray 81 (S112). While the sheet is not mounted on the supply tray 91 (S112: NO), the MFP 100 waits for the sheet to be mounted on the supply tray 91.

When the sheet is present on the supply tray 91 (S111: YES), or when the sheet has been mounted on the supply tray 91 (S112: YES), the MFP 100 creates the password (S101). Thereafter, the MFP 100 determines whether or not a print job exists (S103). When the print job exists (S103: YES), the MFP 100 executes the sheet-feed and print process (S104).

After the step S104, the MFP 100 determines whether or not the printing has been executed in the step S104 (S204). When the printing has been executed (S204: YES), the MFP 100 executes the password deletion process (S205). The process of the step S205 is the same as that of the step S167 executed in the sheet-feed and print process.

By determining that the printing corresponding to the print job to which the password created in the step S101 is added has been executed, use of the sheet mounted on the supply tray 91 can be considered to be completed. Therefore, the MFP 100 becomes more usable by deleting the password without waiting for the sheet to be used.

On the other hand, when the printing has not been executed, that is, when the step S104 is completed without execution of the print job to which the password created in the step S101 is added (S204: NO), it can be considered that the user who had mounted the sheet on the supply tray 91 has not input the print job. Therefore, the MFP 100 does not delete the password.

After the step S205, or when a negative determination is obtained in the step S204, the MFP 100 determines presence or absence of the sheet on the supply tray 91 (S106). When the sheet is present (S106: YES), the MFP 100 returns to the step S103 and determines whether or not the print job exists. When the sheet is not present (S106: NO), the MFP 100 executes the password deletion process (S107). After the step S107, the MFP 100 ends the restriction print process.

In the second embodiment described above, the deletion condition of the password includes a condition where the printing corresponding to the first job is completed. When the printing corresponding to the first job is completed, necessity of restricting the use of the supply tray 91 becomes low. Thus, the MFP 100 deletes the password and prompts other users to use the supply tray 91.

[Third Embodiment]

Figure 8:
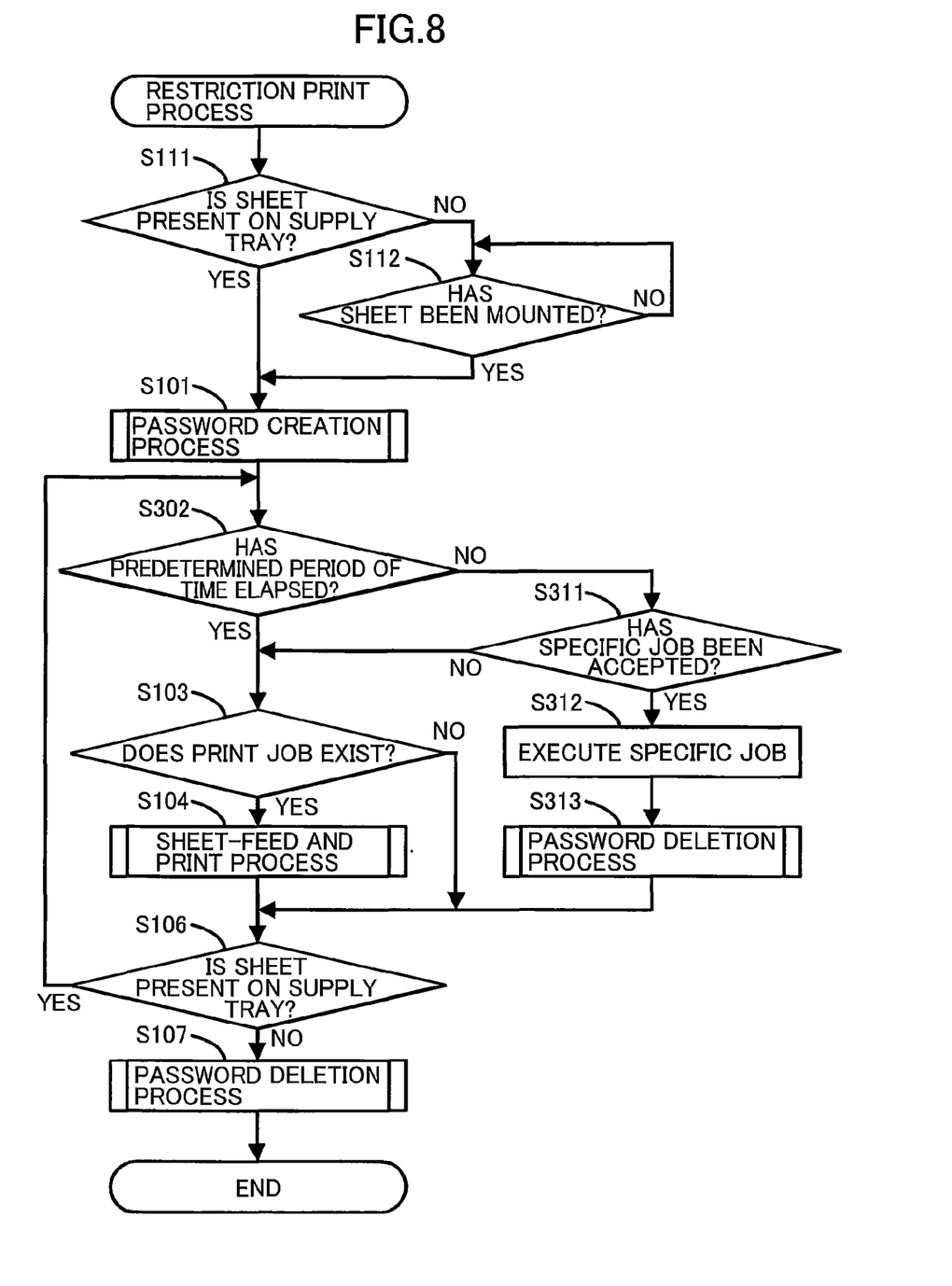
FIG. 8 is a flowchart illustrating steps in a restriction print process according to a third embodiment.

Next, still another embodiment of the restriction print process will be described with reference to a flowchart shown in FIG. 8. In the restriction print process according to a third embodiment, when the job is input through the operation panel 40 immediately after creation of the password, the MFP 100 executes the input job even when the job does no accompany the password. The third embodiment differs from the first embodiment in which the job input through the operation panel 40 immediately after the creation of the password is not distinguished from other jobs. In the following description, the same processes as those of the first embodiment are designated by the same reference numerals to avoid duplicating description.

In the restriction print process according to the third embodiment, the MFP 100 first determines whether or not the sheet is present on the supply tray 91 (S111). When the sheet is not present on the supply tray 91 (S111: NO), the MFP 100 determines whether or not the sheet has been mounted on the supply tray 91 (S112). While the sheet is not mounted on the supply tray 91 (S112: NO), the MFP 100 waits for the sheet to be mounted on the supply tray 91.

When the sheet is present on the supply tray 91 (S111: YES), or when the sheet has been mounted on the supply tray 91 (S112: YES), the MFP 100 creates the password (S101). Thereafter, the MFP 100 determines whether or not a predetermined period of time has elapsed from the creation of the password (S302). The predetermined period of time may be, for example, 10 seconds.

When the predetermined period of time has not elapsed (S302: NO), the MFP 100 determines whether or not a specific job to be input through the operation panel 40 has been accepted (S311). The specific job corresponds to a copy job, or a download print job or a direct print job that select and acquire an image to be printed from images stored in an external device such as a PC, a flash memory, or the like and print the acquired image.

When the specific job has not been accepted (S311: NO) even after the predetermined period of time has elapsed (S302: YES), the MFP 100 determine whether or not a print job transmitted from an external device exists (S103). When the print job exists (S103: YES), the MFP 100 executes the sheet-feed and print process (S104).

When the specific job has been accepted within the predetermined period of time after the creation of the password (S311: YES), the MFP 100 feeds the sheet from the supply tray 91 to make the image forming unit 10 execute printing corresponding to the specific job (S312). That is, when the job is input through the operation panel 40 immediately after the creation of the password, the input job is highly likely to be a job of the user who has mounted the sheet. Thus, the MFP 100 executes the job even when the job does not accompany the password.

After the step S312, the MFP 100 executes the password deletion process (S313). The process of the step S313 is the same as that of the step S167 executed in the sheet-feed and print process. By determining that the specific job has been executed, use of the sheet mounted on the supply tray 91 can be considered to be completed. Therefore, the MFP 100 becomes more usable by deleting the password without waiting for the sheet to be used.

After the step S313, or after the step S104, or when a negative determination is obtained in the step S103, the MFP 100 determines presence or absence of the sheet on the supply tray 91 (S106). When the sheet is present (S106: YES), the MFP 100 returns to the step S103 and determines whether or not the job exists. When the sheet is not present (S106: NO), the MFP 100 executes the password deletion process (S107). After the step S107, the MFP 100 ends the restriction print process.

In the restriction print process according to the third embodiment, when accepting a print job (third job) on the basis of operation through the operation panel 40 within a predetermined period of time after the output signal value of the sheet sensor 38 changes from the value indicating absence of the sheet to the value indicating presence of the sheet, the MFP 100 starts the printing corresponding to the third job. When the print job is input by the operation through the operation panel 40 immediately after the mounting of the sheet, the input job is highly likely to be a job of the user who has mounted the sheet. Thus, the MFP 100 executes the input job even when the job does not accompany the password, thereby reducing time and labor of the user required to input the password.

Further, when starting the printing corresponding to the third job, the MFP 100 deletes the password from the NVRAM 34. When the third job based on operation through the operation panel 40 is input, the first job is less likely to be input afterward. Thus, the MFP 100 deletes the password.

In the third embodiment, the processes of the steps (S302, S311 to S313) to be performed when the job is input through the operation panel 40 immediately after the creation of the password are added to the first embodiment. Alternatively, the processes of the steps (S302, S311 to S313) may be added to the second embodiment. That is, the process of determining whether or not the printing has been executed in the step S104 (S204) and the process of deleting the password (S205) are added after the step S104 of the restriction print process of the second embodiment, and after the step S205 or when a negative determination is obtained in the step S204 or in the step S103, or after the step S313, the MFP 100 shifts to the step S106.

While the description has been made in detail with reference to the embodiments thereof, it would be apparent to those skilled in the art that various changes and modifications may be made therein without departing from the spirit and scope of the above described embodiments. For example, the printing device is not limited to the MFP, but may be applicable to devices having a print function such as a printer, a copy machine, a facsimile device, and the like.

Further, although the MFP 100 of the embodiments has only one supply tray, it may have a plurality of supply trays. In this case, passwords corresponding to respective supply trays are created and stored in association with the corresponding supply trays. When accepting a print job to use a supply tray to which the password is set, the MFP 100 does not execute the printing if the password is not added to the accepted print job. When accepting a print job to use a supply tray to which the password is not set, the MFP 100 executes the print job regardless of whether or not the password is added to the print job. Thus, when the plurality of supply trays is provided, whether or not to execute the printing can be controlled for each supply tray.

Further, in the embodiments described above, the password is created so as to restrict the printing when the sheet type belongs to a specific sheet type. However, the password may be created regardless of the sheet type so as to restrict the printing.

Further, in the embodiments described above, the password is automatically deleted during the restriction print process when a predetermined condition is met after the creation of the password. However, the automatic deletion of the password need not always be performed. That is, the password may be deleted in response to an input of a password deletion instruction by the user. Further, when the printing cannot be started within a predetermined period of time after creation of the password, deletion of the password may be requested or the password may be automatically deleted.

Further, in the embodiments described above, in the case that a print job to which the password stored in the NVRAM 34 is not added is accepted during storage of the password, the accepted print job is cancelled. However, the accepted print job need not necessarily be cancelled. That is, the printing only needs to be restricted during the storage of the password, and, for example, execution of the printing may be suspended until the password is deleted. Alternatively, a configuration may be adopted in which a print job to which no password is added is prevented from being accepted.

Further, in the embodiments described above, the password is not created at a time when the printing is resumed from the interruption. However, the password may be created, and input of the password may be requested so as to resume the printing.

Further, the processes in the embodiments described above may be performed by a single CPU, a plurality of CPUs, hardware such as an ASIC, or a combination thereof. Further, the processes in the embodiments described above may be implemented in various forms such as a recording medium having a program for executing the processes or a method of performing the processes.

What is claimed is:
1. A printing device comprising:
   a supply tray;
   a sensor configured to selectively output a first signal indicating absence of a sheet on the supply tray and a second signal indicating presence of a sheet on the supply tray;
   a print unit;
   a memory; and
   a controller configured to:
      enable a restriction print process;
      create first authentication information and store the first authentication information in the memory, in response to the second signal being detected after the restriction print process is enabled;
      accept a job that uses a sheet on the supply tray;
      determine that a first job is accepted, the first job being such a job that accompanies second authentication information, the first job being executable when the second authentication information is in coincidence with the first authentication information;

control the print unit to execute the first job; and delete the first authentication information from the memory when the first signal is detected after the first authentication information is stored in the memory in response to the second signal being detected.

2. The printing device according to claim 1, wherein the controller is further configured to determine that a second job is accepted, the second job being such a job that does not accompany authentication information, the second job being not executable when the first authentication information is stored in the memory.

3. The printing device according to claim 1, wherein the controller is further configured to determine that a second job is accepted, the second job being such a job that accompanies third authentication information, the second job being not executable when the third authentication information is not in coincidence with the first authentication information.

4. The printing device according to claim 1, wherein the controller is further configured to notify a user who has mounted the sheet on the supply tray of the first authentication information.

5. The printing device according to claim 1, wherein the controller is further configured to resume execution of the first job without creating authentication information when an error is resolved after the execution of the first job is interrupted due to the error.

6. The printing device according to claim 5, wherein the error is absence of the sheet on the supply tray; and
wherein the controller is further configured to resume the execution of the first job without creating authentication information when the first signal changes to the second signal.

7. The printing device according to claim 1, wherein the controller is further configured to delete the first authentication information from the memory when execution of the first job is completed.

8. The printing device according to claim 1, wherein the controller is further configured to delete the first authentication information from the memory when an error is not resolved for a predetermined duration of time elapses after execution of the first job is interrupted due to the error.

9. The printing device according to claim 1, wherein the controller is further configured to keep storage of the first authentication information in the memory until a time when the second signal changes to the first signal, provided that execution of the first job is completed and the sheet is present on the supply tray.

10. The printing device according to claim 9, wherein the controller is further configured to control the print unit to execute a second job when the second job is accepted after the execution of the first job is completed while the sheet is present on the supply tray, the second job being such a job that accompanies third authentication information, the second job being executable when the third authentication information is in coincidence with the first authentication information.

11. The printing device according to claim 9, wherein the controller is further configured to delete the first authentication information from the memory when the second signal changes to the first signal after the execution of the first job is completed.

12. The printing device according to claim 1, wherein the controller is further configured to:
acquire information about a sheet type of the sheet on the supply tray; and
determine whether to create the first authentication information depending on the sheet type.

13. The printing device according to claim 1, further comprising an operation unit configured to accept an input operation,
wherein the controller is further configured to:
accept a third job through the operation unit; and
control the print unit to execute the third job when the third job is accepted before expiration of a first duration of time after a time when the first signal changes to the second signal.

14. The printing device according to claim 13, wherein the controller is further configured to delete the first authentication information from the memory when execution of the third job is completed.

15. The printing device according to claim 1, wherein the controller is configured to accept the first job from a request source; and
wherein the controller is further configure to notify the request source of interruption of the first job when the first job is interrupted.

16. The printing device according to claim 15, wherein the controller is further configured to notify devices other than the request source of the interruption of the first job when execution of the first job is not resumed for a second duration of time after interruption of the first job.

\* \* \* \* \*